United States Patent
Kuhns et al.

(10) Patent No.: US 10,322,821 B2
(45) Date of Patent: Jun. 18, 2019

(54) HIGH WING COMPENSATION SYSTEM

(71) Applicant: EATON CORPORATION, Cleveland, OH (US)

(72) Inventors: Matthew M. Kuhns, Santa Clarita, CA (US); Robert L. Sbonek, Garden Grove, CA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/762,645

(22) PCT Filed: Sep. 27, 2016

(86) PCT No.: PCT/US2016/053944
§ 371 (c)(1),
(2) Date: Mar. 23, 2018

(87) PCT Pub. No.: WO2017/058785
PCT Pub. Date: Apr. 6, 2017

(65) Prior Publication Data
US 2018/0265221 A1   Sep. 20, 2018

Related U.S. Application Data

(60) Provisional application No. 62/233,660, filed on Sep. 28, 2015.

(51) Int. Cl.
*B64F 1/28* (2006.01)
*B67D 7/08* (2010.01)

(52) U.S. Cl.
CPC . *B64F 1/28* (2013.01); *B67D 7/08* (2013.01)

(58) Field of Classification Search
CPC .................................. B64F 1/28; B67D 7/08
See application file for complete search history.

(56) References Cited

U.S. PATENT DOCUMENTS

2011/0061740 A1    3/2011   Watkins

FOREIGN PATENT DOCUMENTS

WO     2012013957 A1     2/2012

OTHER PUBLICATIONS

International Search Report, PCT/US2016/053944, dated Dec. 16, 2016.

*Primary Examiner* — Jason K Niesz
(74) *Attorney, Agent, or Firm* — Fishman Stewart PLLC

(57) ABSTRACT

The present disclosure includes a fluid system that may include a fluid conduit (30) that may be configured for connection with a fluid source (20) and a fluid destination (80). The system may include a fluid regulator (40) that may be configured to regulate fluid flow between said fluid source (20) and said fluid destination (80). The system may include a nozzle (66) that may be connected to the fluid conduit and may configured to connect the fluid conduit with said fluid destination. The system may include a first sensor (70.1) that may be connected to the fluid conduit, and a second sensor (70.4) that may be configured to acquire information from which a height of the nozzle can be determined. The system may include a controller (50) that may be configured to control operation of the fluid regulator according to (i) an output of the first sensor and (ii) the information acquired by the second sensor.

20 Claims, 6 Drawing Sheets

HIGH WING COMPENSATION SYSTEM

CROSS-REFERENCE TO RELATED APPLICATION

This application is a National Stage Patent Application of International Patent Application No. PCT/US2016/053944, filed Sep. 27, 2016, which claims the benefit of U.S. Provisional Application Ser. No. 62/233,660, filed Sep. 28, 2015, the contents of both are incorporated by reference in their entireties.

TECHNICAL FIELD

The present disclosure relates to fluid systems, including fluid fuel systems that may be used with aircrafts having different wing heights.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Existing fluid systems that may, for example, be used in aircraft refueling applications may not consider/compensate for the difference in fluid filling heights between a calibration height/first filling height (e.g., a first plane with wings relatively low to the ground) and a second filling height (e.g., a second plane with wings located farther off the ground). Height differences may result in a pressure drop in the fluid system, and not compensating for such height differences/pressure drops may reduce fluid fill (e.g., aircraft fueling) efficiency.

There is therefore a desire for solutions/options that minimize or eliminate one or more of the above-described shortcomings. The foregoing discussion is intended only to illustrate the present field and should not be taken as a disavowal of scope.

SUMMARY

In embodiments, a fluid system may include a fluid conduit that may be configured for connection with a fluid source and a fluid destination. The system may include a fluid regulator that may be connected to the fluid conduit and may be configured to regulate fluid flow between said fluid source and said fluid destination. The system may include a nozzle that may be connected to the fluid conduit and may be configured to selectively connect the fluid conduit with said fluid destination. The system may include a first sensor that may be connected to the fluid conduit. The system may include a second sensor that may be configured to provide and/or acquire information from which a height of the nozzle can be extracted and/or determined. The system may include a controller that may be configured to control operation of the fluid regulator according to (i) an output of the first sensor and (ii) the information provided by the second sensor.

In embodiments, a method of controlling fluid flow may comprise providing a fluid system that may comprise a fluid control system, and a fluid conduit between a fluid source and a fluid destination. The fluid control system may include a fluid regulator that may be connected to said fluid conduit and/or a flow sensor that may be configured to sense a fluid flow rate of fluid in said fluid conduit. The fluid control system may include a pressure sensor that may be configured to sense a fluid pressure of the fluid conduit downstream of the fluid regulator. The fluid control system may include a nozzle that may be connected to said fluid conduit and may be configured to selectively connect said fluid conduit with said fluid destination. The fluid control system may include a height sensor that may be configured to determine a nozzle height and a controller that may be configured to control operation of the fluid regulator. The method may include obtaining, via the controller, a nozzle height difference according to the nozzle height in a calibration configuration of the fluid system and a current value of the nozzle height. The method may include deriving an expected nozzle pressure according to at least the fluid flow rate, the fluid pressure, and the nozzle height difference. The method may include controlling operation of the fluid regulator according to the expected nozzle pressure.

The foregoing and other aspects, features, details, utilities, and advantages of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the invention to these embodiments. On the contrary, the disclosure is intended to cover alternatives, modifications and equivalents, which may be included within the spirit and scope of the disclosure.

Figure 1:
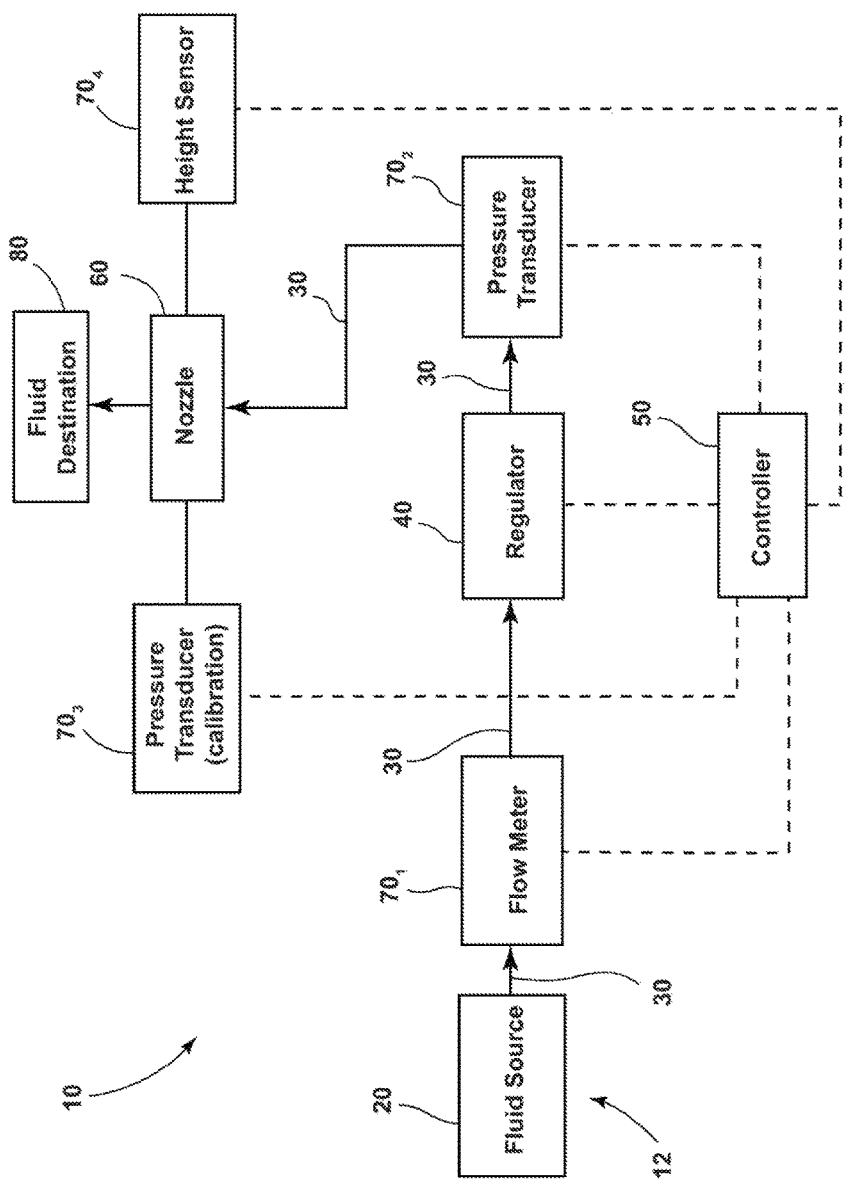
FIG. 1 is a schematic view generally illustrating an embodiment of a fluid system embodying teachings of the present disclosure.

In embodiments, such as generally illustrated in FIG. 1, a fluid system 10 may include a source 20 of fluid 12, a fluid conduit 30, a fluid regulator 40, a controller 50, a nozzle 60, one or more sensors $70_N$, and/or a fluid destination 80. In embodiments, fluid source 20 may include, for example, a fixed fluid tank (e.g., in-ground and/or above ground), a mobile fluid tank (e.g., a fluid truck, fluid trailer, etc.), or a combination of a fixed fluid tank and a mobile fluid tank. In embodiments, fluid source 20 may be configured to hold fluids, such as aircraft fuel. In embodiments, fluid destination 80 may include a fluid tank, such as, for example, a fuel tank in a wing of an aircraft.

In embodiments, fluid conduit 30 may be configured to provide fluid communication between some or all of the components of fluid system 10. For example, and without limitation, fluid conduit 30 may include one or more of a rigid conduit, a flexible conduit, a polymeric conduit, a metal conduit, a tube, a duct, and/or a hose. In embodiments, fluid conduit 30 may provide fluid communication between fluid source 20 and fluid regulator 40 and/or between fluid regulator 40 and nozzle 60. In embodiments, nozzle 60 may include one or more of a variety of configurations. In embodiments, nozzle 60 may be connected and/or fixed to fluid conduit 30. In embodiments, nozzle 60 may configured to be selectively coupled to fluid destination 80 and/or may be configured to selectively connect (e.g., provide fluid communication between) fluid conduit 30 and destination 80.

In embodiments, a first sensor $70_1$ may be connected to fluid conduit 30 between fluid source 20 and fluid regulator 40. First sensor $70_1$ may be configured to measure a flow rate of fluid 12 in fluid conduit 30 and/or may include a fluid flow meter. In embodiments, a second sensor $70_2$ may be connected to fluid conduit 30 between fluid regulator 40 and nozzle 60. Second sensor $70_2$ may be configured to measure a pressure of fluid 12 in fluid conduit 30 at or about an outlet of fluid regulator 40 and/or may include a fluid pressure transducer. In embodiments, fluid conduit 30 may include, for example, a length of about 30 feet to about 50 feet between second sensor $70_2$ and nozzle 60.

In embodiments, a third sensor $70_3$ may be connected to nozzle 60 and/or connected to fluid conduit 30 at or about nozzle 60. Third sensor $70_3$ may be configured to measure a fluid pressure at nozzle 60 and/or may include a pressure transducer. In embodiments, third sensor $70_3$ may be removable and/or may, for example, only be used and/or connected during testing/calibration of fluid system 10.

In embodiments, controller 50 may include an electronic controller and/or include an electronic processor, such as a programmable microprocessor and/or microcontroller. In embodiments, controller 50 may include, for example, an application specific integrated circuit (ASIC). Controller 50 may include a central processing unit (CPU), memory, and/or an input/output (I/O) interface. Controller 50 may be configured to perform various functions, including those described in greater detail herein, with appropriate programming instructions and/or code embodied in software, hardware, and/or other medium. In embodiments, controller 50 may include a plurality of controllers. In embodiments, controller 50 may be connected to a display 52.

In embodiments, controller 50 may be configured to control the operation of fluid regulator 40 to control fluid flow between fluid source 20 and nozzle 60 (and/or fluid destination 80 ). In embodiments, fluid regulator 40 may include one or more of a variety of configurations. In embodiments, fluid regulator 40 may be connected to fluid conduit 30 and may be configured to control the fluid pressure and/or the fluid flow rate of fluid 12 in fluid conduit 30. In embodiments, fluid regulator 40 may include and/or be configured as one or more of a pressure control valve, a pressure regulator, and a fluid flow rate control device. For example, and without limitation, fluid regulator 40 may be configured in the same or a similar manner as the pressure control valve described in commonly owned U.S. Pat. No. 5,660,168, which is hereby incorporated by reference herein in its entirety.

In embodiments, controller 50 may control operation of fluid regulator 40 according to an fluid pressure $P_2$ at or about nozzle 60 and an actual value $P_{2a}$ of pressure $P_2$ may be determined/measured via third sensor $70_3$. In embodiments, it may not be desirable and/or permitted for third sensor $70_3$ to remain connected to fluid system 10 during normal use (e.g., refueling). In such embodiments, an expected nozzle pressure $P_{2e}$ may be estimated/derived (e.g., by controller 50 ) according to the following equation:

$$P_{2e} = P_1 - \left( \frac{Q^2}{C_v^2 \frac{62.4}{\rho}} \right) \qquad \text{Eq. 1}$$

where $P_1$ corresponds to the fluid pressure in fluid conduit 30, (e.g., as sensed via second sensor $70_2$), Q corresponds to a fluid flow rate in fluid conduit 30 (e.g., as sensed via first sensor $70_1$), $C_v$ corresponds to a system flow coefficient, and p corresponds to the density of fluid 12 (e.g., in pounds per cubic foot). In embodiments, system flow coefficient $C_v$ may not be known, at least initially, and fluid system 10 may be tested/calibrated with third sensor $70_3$ connected to nozzle 60 (e.g., in a calibration configuration 108, such as generally illustrated FIG. 5). During calibration, third sensor $70_3$ may be connected to nozzle 60 and/or fluid conduit 30 to provide the actual nozzle pressure $P_{2a}$, which may be used instead of the expected nozzle pressure $P_{2e}$ in Equation 1 during calibration. While third sensor $70_3$ is connected to nozzle 60, controller may be configured to simultaneously obtain actual nozzle pressure $P_{2a}$ via third sensor $70_3$ and fluid pressure $P_1$ via second sensor $70_2$. In such a calibration configuration, for example, controller 50 may be configured to obtain all values besides $C_v$ and may be determine/calculate $C_v$ according to Equation 1. Once $C_v$ has been determined, third sensor $70_3$ may be disconnected from fluid system 10 and/or nozzle 60, and the expected nozzle pressure $P_{2e}$ may be calculated according Equation 1 the during normal use (e.g., refueling). In embodiments, once $C_v$ has been determined, it may not be necessary to recalibrate fluid system 10 even if fluid system 10 is used in connection with aircrafts having different wing heights, as described in greater detail herein.

Figure 2B:
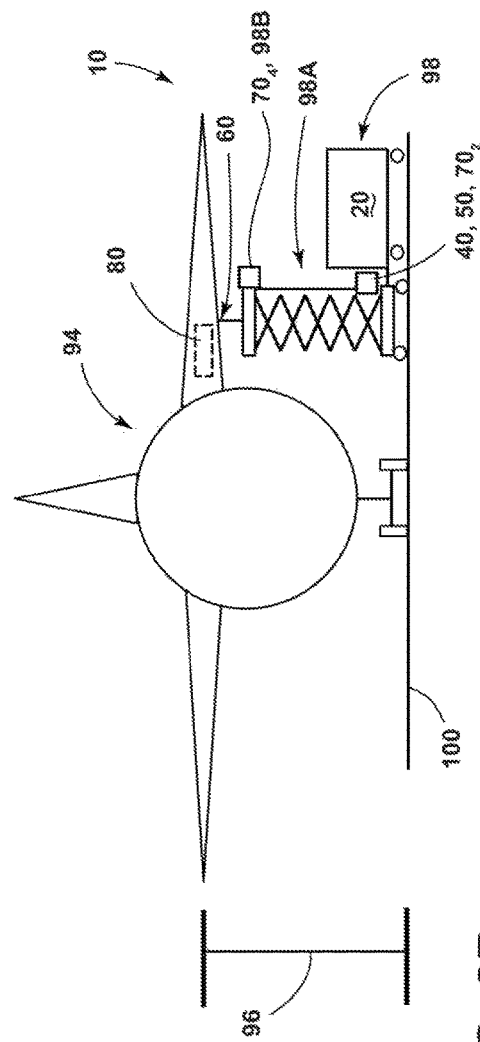
FIGS. 2A and 2B are illustrations of embodiments of fluid systems embodying teachings of the present disclosure and aircrafts with different wing heights.
Figure 2A:
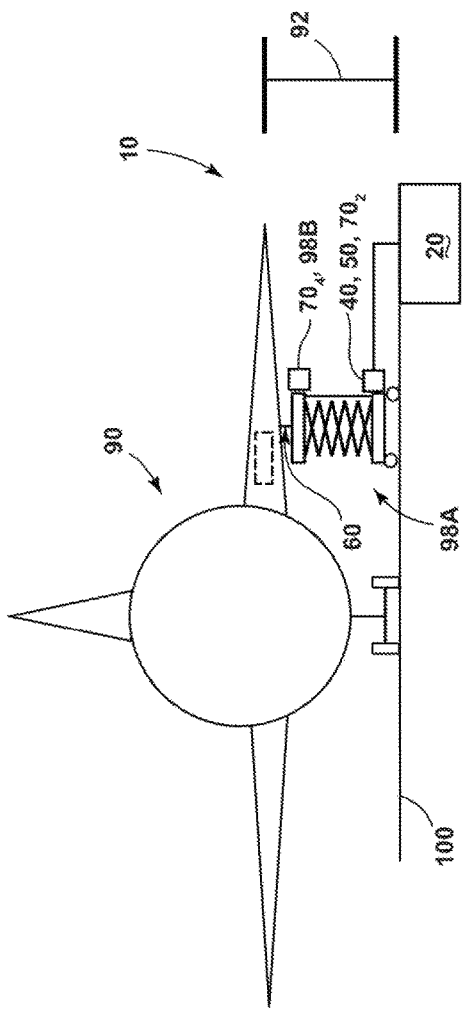

In embodiments, the actual height $h_2$ of nozzle 60 during normal use may not be the same or substantially the same as the height $h_1$ of nozzle when $C_v$ was determined (e.g., during testing/calibration). For example, and without limitation, as generally illustrated in FIG. 2A, fluid system 10 may be used in connection with a first aircraft 90 that may include a low wing height 92 relative to the ground 100 and/or fluid system 10 may be tested/calibrated according to this relatively low wing height. In embodiments, first aircraft 90 may include, for example, a Boeing® 737, which may include a wing height of about 12 feet. In embodiments, it may be desirable to use fluid system 10 in connection with other applications, such as with a second aircraft 94 that may include a higher wing height 96 (see, e.g., FIG. 2B). In embodiments, second aircraft 94 may include, for example, and Airbus® A380, which may include a wing height of about 21 feet. In embodiments, it may be desirable to compensate for nozzle 60 being disposed at different heights (e.g., being connected to and/or calibrated for first aircraft 90 and then used with second aircraft 94).

In embodiments, fourth sensor $70_4$ may be configured to provide and/or acquire information from which a nozzle height difference Δh between the reference/calibration point $h_1$ (e.g., wing height 92) and the actual nozzle height $h_2$ (e.g., wing height 96) may be determined (Δh=$h_1$-$h_2$). For example, and without limitation, fourth sensor may include an altimeter and/or an optical/laser sensor. In embodiments, the information provided by fourth sensor $70_4$ may include the height difference itself Δh. Additionally or alternatively, the information may include an absolute height of fourth sensor $70_4$, which may be used as the height of nozzle 60

(and/or fluid destination 80), and the nozzle height difference Δh may be determined by controller 50 according to a predetermined and/or calibration height $h_1$ of nozzle 60. In embodiments, a controller 50 may be configured to receive a height input (e.g., from a user), directly (e.g., a height value) and/or indirectly (e.g., an aircraft type, from which controller 50 may be configured to determine height).

In embodiments, fourth sensor 70₄ may be connected to nozzle 60 and/or may be connected to a lift device 98A that may be configured to lift nozzle 60 above the ground. In embodiments, fourth sensor 70₄ may be integrated with lift device 98A and/or information provided by fourth sensor 70₄ may include and/or be derived from a status of lift device 98A. For example, and without limitation, the status of lift device 98A may include lift positions (e.g., 10% extended, 50% extended, 75% extended, fully extended, etc.) and the lift position may be used to determine height of lift device 98A, such as if the fully extended height is known/predetermined. In embodiments, fourth sensor 70₄ may be configured to determine the lift position of lift device 98A and/or may be configured to communicate with a lift position sensor 98B of lift device 98A. In embodiments, lift device 98A may permit nozzle 60 to move between calibration height $h_1$ and different heights, such as height $h_2$. For example, and without limitation, lift device 98A may include a lift deck of a fueling tool 98 (e.g., a fuel truck that may include fluid source 20) and/or may be configured to lift nozzle 60 up to a fluid destination 80, such as wings of first aircraft 90 and/or second aircraft 94. In embodiments, information provided by fourth sensor 70₄ may include the height of lift device 98A and controller 50 may use the height of lift device as the actual height $h_2$ of nozzle 60 (e.g., if the height difference between lift device 98A and nozzle 60/fluid destination 80 is expected to be the same across multiple applications/aircrafts).

If the Bernoulli equation is manipulated based on certain assumptions (e.g., that inputs to and environment factors of fluid system 10 are the same when used with first aircraft 90 and second aircraft 94), a hydraulic grade line (HGL) of fluid system 10 may be represented by the following equation:

$$\frac{P}{\rho} + \frac{v^2}{2} + gz = c \rightarrow HGL = \frac{P}{\gamma} + \Delta h \qquad \text{Eq. 2}$$

where P corresponds to the fluid pressure (e.g., at nozzle 60), γ corresponds to the specific weight of fluid 12 (e.g., in pounds per cubic inch), and h is the height above a reference/calibration point (e.g., nozzle height difference Δh). In embodiments, Equation 2 may be arranged for two cases (e.g., two uses of fluid system 10):

$$\frac{P_1}{\gamma} + h_1 = \frac{P_2}{\gamma} + h_2 \qquad \text{Eq. 3}$$

Figure 3:
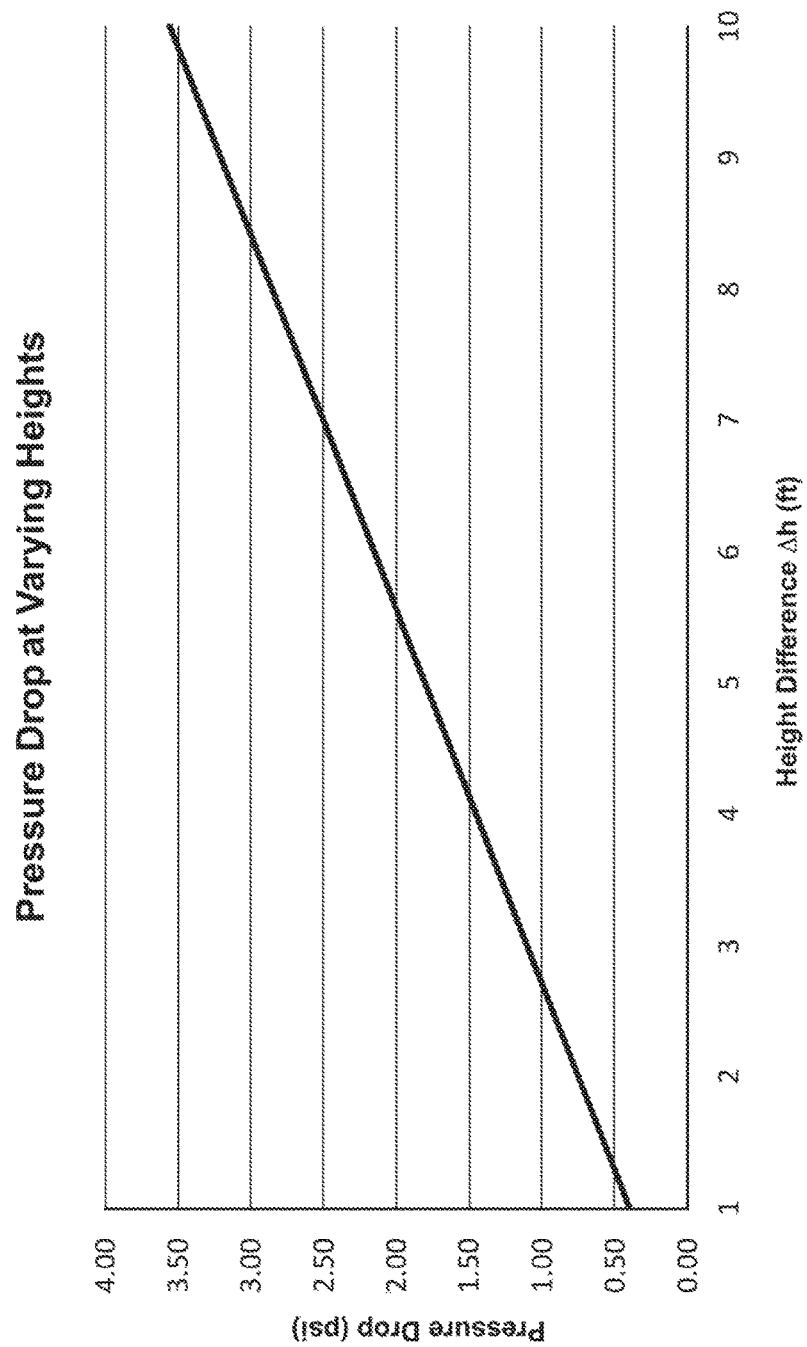
FIG. 3 is a graphical representation generally illustrating a relationship between nozzle height difference and pressure drop at the nozzle.

In embodiments, Equation 3 may be used, at least in part, to determine a pressure difference/drop that may result from the nozzle height difference Δh. For example, and without limitation, FIG. 3 generally illustrates an example relationship between the pressure drop (e.g., $P_2-P_1$) and the height difference Δh between $h_1$ and $h_2$. In the example of FIG. 3, pressure $P_1$ is assumed to be in a range of about 35-45 psi (pounds per square inch), nozzle calibration height $h_1$ is assumed to be about 12 feet, and γ is assumed to be about 0.0292 lb/in³. As illustrated, as the height difference Δh increases, the pressure drop may also increase, and the relationship between nozzle height difference Δh and pressure drop may be generally linear.

In embodiments, the pressure drop that may result from a nozzle height difference Δh may also affect filling times of fluid destination 80 (e.g., fueling times). In embodiments, pressure $P_1$ may correspond to the nozzle pressure at the calibration height $h_1$ and/or may be referred to as an expected nozzle pressure. In embodiments, the relationship between pressure $P_1$, the nozzle pressure $P_2$ (reduced by the pressure drop), the expected flow rate $Q_1$ at nozzle 60 (based on $P_1$ without a pressure drop, which may be the same or about the same as flow rate Q detected by first sensor 70₁), and the actual flow rate $Q_2$ at nozzle 60 (based on $P_2$) may be represented by the following equation:

$$\left(\frac{P_1}{P_2}\right)^{1.85} = \frac{Q_1}{Q_2} \qquad \text{Eq. 4}$$

Figure 4A:
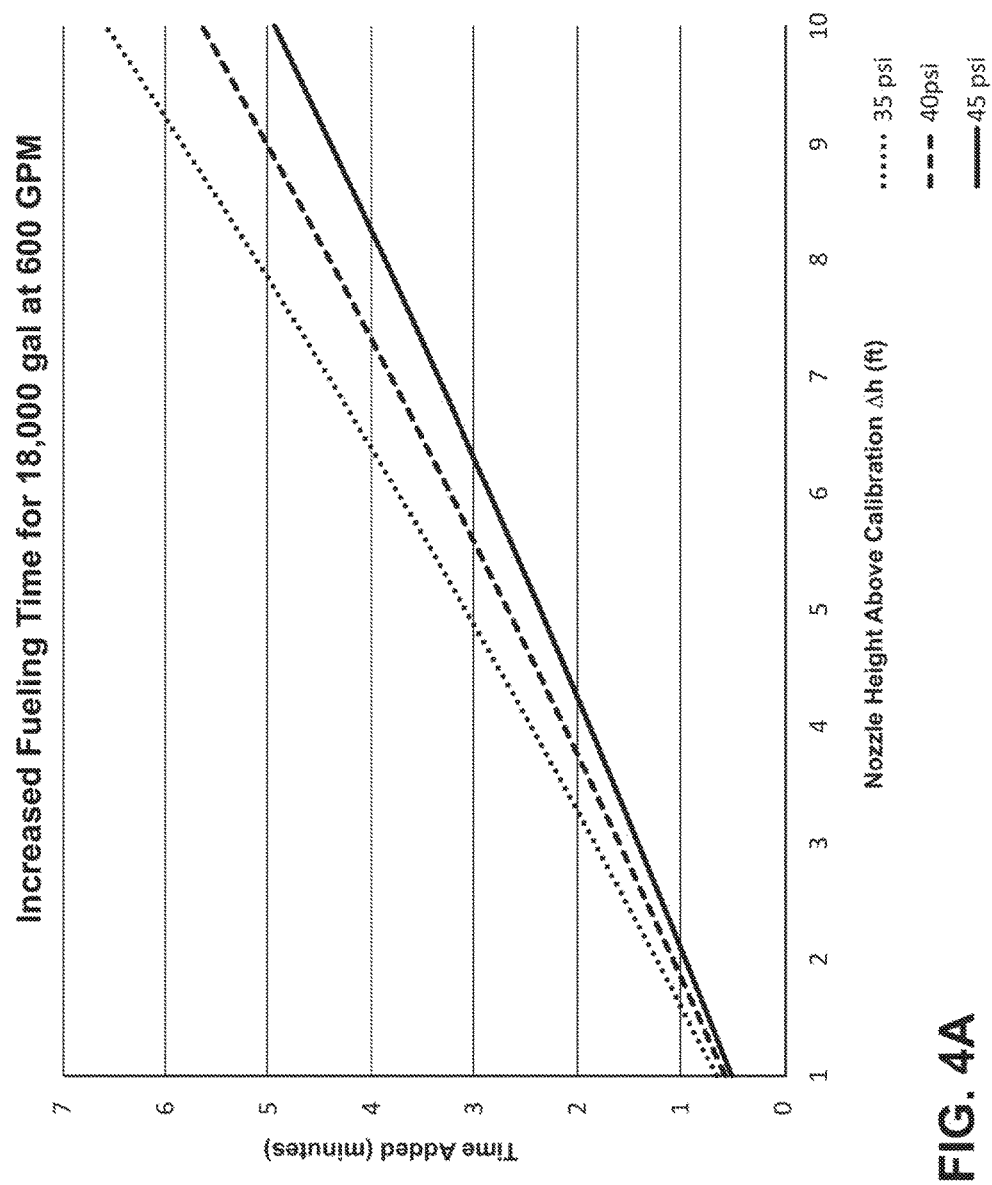
FIGS. 4A and 4B are graphical representations generally illustrating relationships between nozzle height difference and fluid fill times.
Figure 4B:
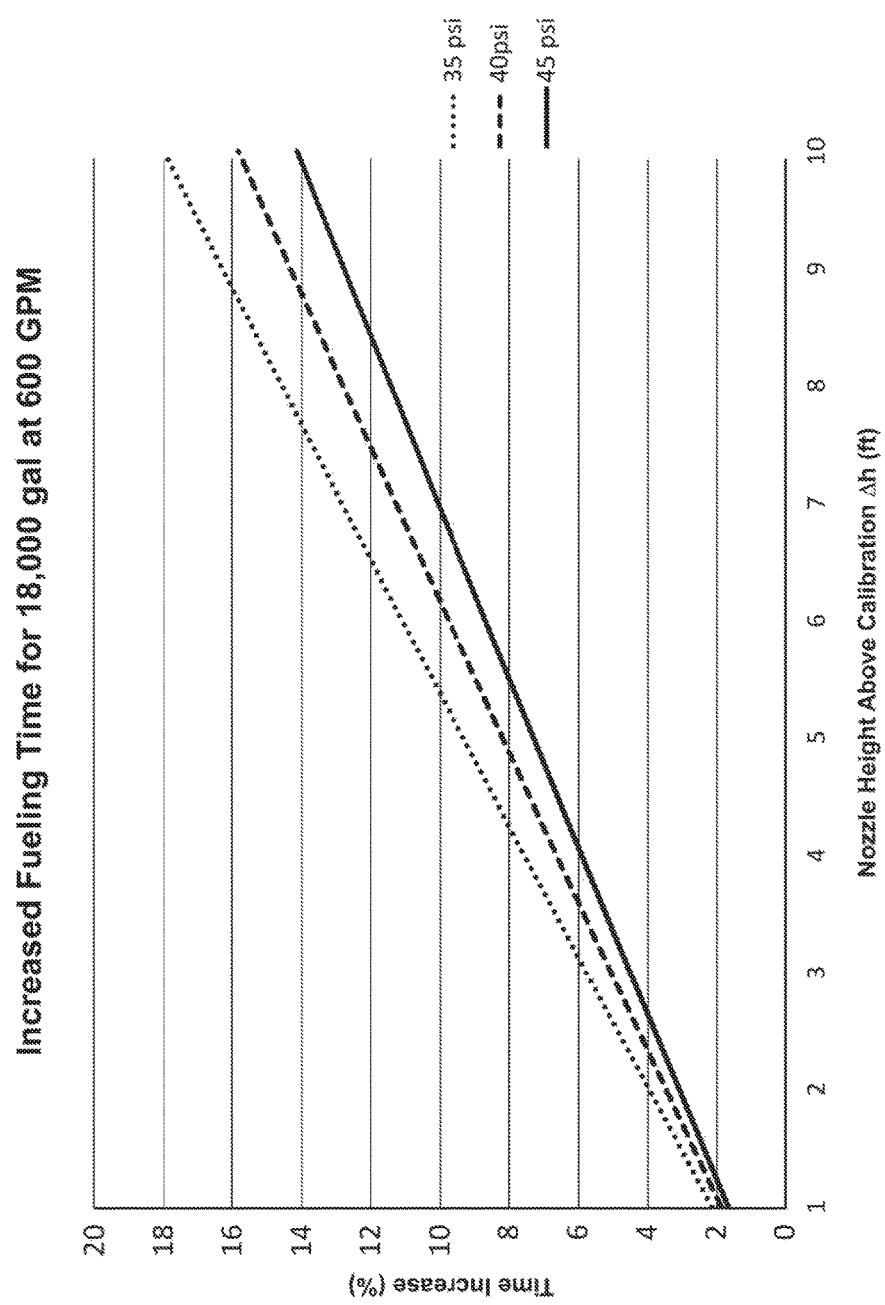

For example, the graphs in FIGS. 4A and 4B generally illustrate the increase in fueling time in minutes and as a percentage, respectively, for each foot of height difference Δh between actual nozzle height $h_2$ and the calibration nozzle height $h_1$. In this example, destination 80 may include about an 18,000 gallon capacity fuel tank disposed in second aircraft 94 and the expected flow rate $Q_1$ may be about 600 gallons per minute (gpm). As generally illustrated in FIGS. 4A and 4B, if fluid system 10 is originally calibrated for a first wing height 92 (e.g., 12 feet), but is then used with second aircraft 94, which may include a wing height 96 of about 9 additional feet (e.g., 21 feet total), fueling time may increase by at least 12%, depending on fluid pressure.

In embodiments, controller 50 may be configured to compensate for the pressure drop that may result from a nozzle height difference Δh. In embodiments, the relationship between the nozzle height difference Δh and pressure drop at nozzle 60 may be generally linear. For example, and without limitation, during normal use (e.g., if third sensor 70₃ is not being used), controller 50 may be configured to determine/estimate the expected nozzle pressure $P_{2e}$ according to the following revised version of Equation 1:

$$P_{2e} = P_1 - \left(\frac{Q^2}{C_v^2 \frac{62.4}{\rho}}\right) + x * \Delta h + y \text{ IF } \Delta h \neq 0 \qquad \text{Eq. 5}$$

where Δh corresponds to nozzle height difference (e.g., the calibration nozzle height $h_1$ less the actual nozzle height $h_2$), x corresponds to an offset coefficient, and a y corresponds to an offset constant. In embodiments, controller 50 may be configured to determine offset coefficient x and/or offset constant y via Equation 3 and/or may include a database of previously determined offset coefficients x and/or offset constants y. For example, and without limitation, controller 50 may determine that for a particular application of an embodiment of fluid system 10, the offset coefficient is about 0.3529 and the offset constant is about 0.0371, which may result in the following equation for determining expected nozzle pressure $P_{2e}$:

$$P_{2e} = P_1 - \left(\frac{Q^2}{C_v^2 \frac{62.4}{\rho}}\right) + 0.3529 * \Delta h + .0371 \text{ IF } \Delta h \neq 0 \qquad \text{Eq. 6}$$

In embodiments, a method of controlling fluid flow may include fluid source 20 providing fluid 12 to first sensor $70_1$ and first sensor $70_1$ allowing the fluid 12 to flow to regulator 40 while first sensor $70_1$ measures a flow rate Q of the fluid 12. In embodiments, controller 50 may control the operation of regulator 40 to maintain a desired fluid pressure $P_2$ at nozzle 60. Controlling regulator 40 may include determining a height difference $\Delta h$, if any, between a calibration height $h_1$ and an actual height $h_2$ of nozzle 60 that may be determined via fourth sensor $70_4$. In embodiments, if a nozzle height difference $\Delta h$ exists, controller 50 may control regulator 40 according to Equation 5 such that regulator 40 compensates for the pressure drop caused by the nozzle height difference $\Delta h$. In embodiments, such compensation may include controller 50 causing fluid regulator 40 to increase pressure $P_1$ (e.g., as sensed via second sensor $70_2$) above a desired pressure, so that after the pressure drop, the nozzle pressure $P_2$ may be at or about the desired pressure. For example, and without limitation, the desired pressure may be about 35 psi and the nozzle height pressure drop may be about 3 psi, so controller 50 may cause fluid regulator 40 to increase $P_1$ to about 38 psi, which may result in the nozzle pressure $P_2$ being at or about the desired 35 psi.

Figure 5:
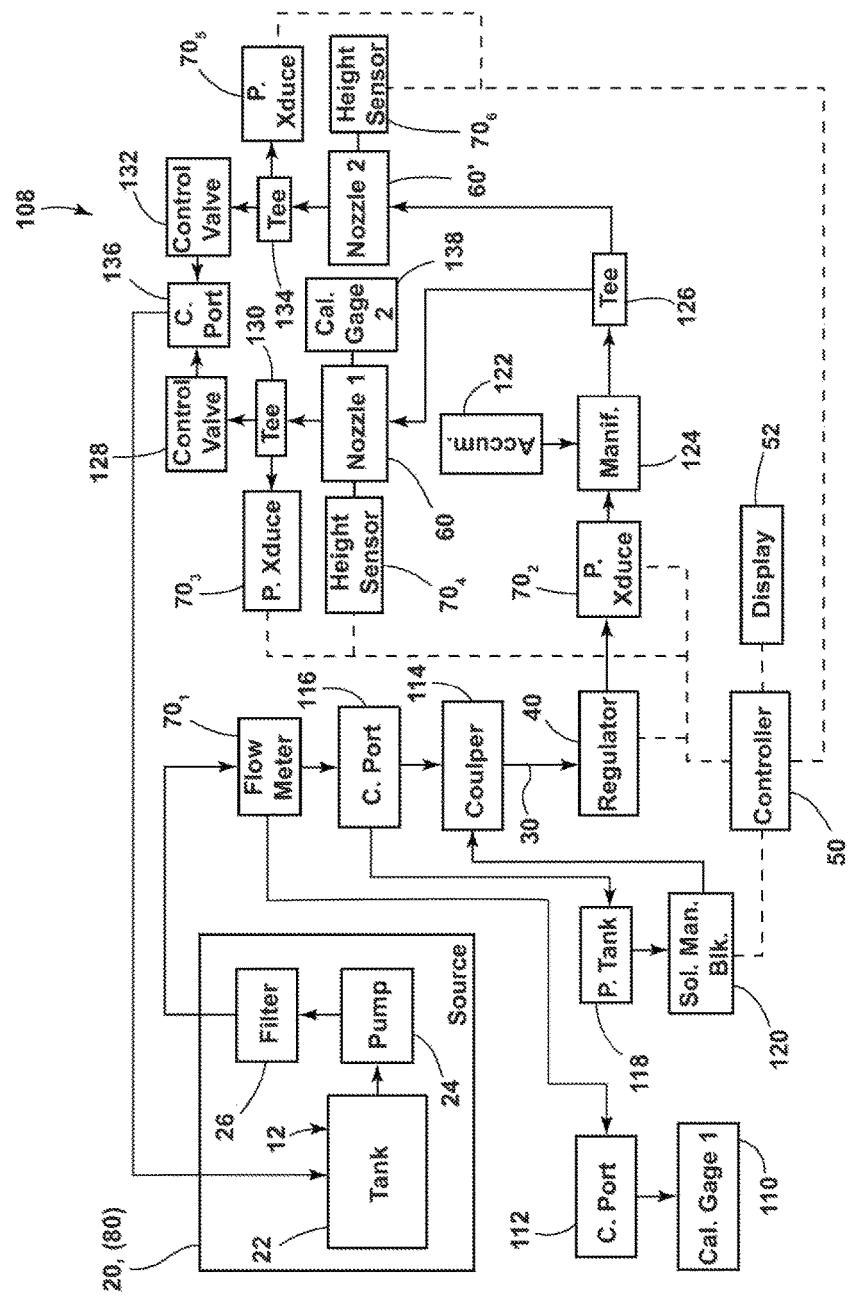
FIG. 5 is a schematic view generally illustrating an embodiment of a test configuration of a fluid system embodying teachings of the present disclosure.

In embodiments, such as generally illustrated in FIG. 5, fluid system 10 may be used in a test configuration 108, such as, for example, to determine flow coefficient C. In embodiments, a test configuration 108 may include fluid source 20, which may include a tank 22, a pump 24 connected to tank 22, and/or a filter 26 connected to pump 24. In embodiments, fluid source 20 may be connected to regulator 40 via fluid conduit 30, which may permit controller 50 to control the flow of fluid 12 from fluid source 20 to nozzle 60 via regulator 40. For example, and without limitation, fluid conduit 30 may connect filter 26 to first sensor $70_1$, which may include a flow meter. First sensor $70_1$ may be connected to a first calibration gage 110, such as via a first control port 112. First sensor $70_1$ may, additionally or alternatively, be connected to a coupler 114 via a second control port 116. Second control port 116 may be connected to a pressure tank 118, which may be connected to a solenoid manifold block 120. Coupler 114 may be connected to regulator 40. Solenoid manifold block 120 may be connected to controller 50 and controller 50 may be configured to control the operation of coupler 114 via solenoid manifold block 120.

In embodiments, regulator 40 may be connected to second sensor $70_2$, which may include a pressure transducer. In embodiments, regulator 40 may, additionally or alternatively, be connected to an accumulator 122 via a manifold 124. Manifold 124 may be connected to nozzle 60 and/or a second nozzle 60' via a first tee 126. Nozzle 60 may be connected to a first control valve 128 and/or third sensor $70_3$, which may include a pressure transducer, via a second tee 130. Second nozzle 60' may be connected to a second control valve 132 and/or a fifth sensor $70_5$, which may include a pressure transducer, via a third tee 134. In embodiments, test configuration 108 may not include a fluid destination 80 and/or fluid 12 provided to nozzle 60 and/or second nozzle 60' may be provided back to fluid source 20 (e.g., fluid source 20 may serve as a fluid destination 80). First and second control valves 128, 132 may be configured to control the flow of fluid 12 from nozzle 60 and second nozzle 60', respectively, back to fluid source 20 and/or may be configured to simulate a fluid destination 80. The outlets of first control valve 128 and second control valve 132 may be connected back to fluid source 20 and/or tank 22 via a third control port 136. In embodiments, nozzle 60 may be connected to a second gage 138.

In embodiments, fourth sensor $70_4$, which may include a height sensor, may be connected to nozzle 60. A sixth sensor $70_6$, which may also include a height sensor, may be connected to second nozzle 60'.

In embodiments, during testing, controller 50 may be configured to determine and/or measure an actual value $P_{2a}$ of the pressure $P_2$ at nozzle 60 via third sensor $70_3$, the height of nozzle 60 via fourth sensor $70_4$, an actual value $P_{2a}'$ of the pressure $P_2'$ at second nozzle 60' via fifth sensor $70_5$, and/or the height of second nozzle 60' via sixth sensor $70_6$. Controller 50 may be configured to determine flow coefficient $C_v$ according to one or more of the pressure $P_{2a}$ at nozzle 60 and/or the pressure $P_{2a}'$ at second nozzle 60' (e.g., controller 50 may use nozzle pressure $P_{2a}$, nozzle pressure $P_{2a}'$, or a combination/average of the two). Controller 50 may be configured to determine a test/calibration height $h_1$ according to the height of nozzle 60 (e.g., via fourth sensor $70_4$) and/or the height of second nozzle 60' (e.g., via sixth sensor $70_6$). In embodiments, fluid system 10 may then be returned to a normal configuration, such as generally illustrated in FIG. 1. In embodiments, controller 50 may be configured to compensate for a nozzle height difference $\Delta h$ that may exist during normal use (e.g., in non-testing situations) according to Equation 3 and, among other things, the test/calibration height $h_1$.

In embodiments, compensating for a nozzle height difference $\Delta h$, such as in the manner described above, may permit embodiments of fluid system 10 to be used in connection with a variety of applications/aircrafts and it may not be necessary to recalibrate fluid system 10 for different fueling heights.

In embodiments, some or all of sensors $70_N$ may be in communication with and/or electrically connected to controller 50 via a wired connection, a wireless connection, and/or a combination of wired and wireless connections. In embodiments, some or all of sensors $70_N$ may be configured as sensors and/or transducers, and may be configured to measure, monitor, detect, and/or otherwise sense properties and/or characteristics of fluid system 10. In embodiments, the outputs of some or all of sensors $70_N$ may include one or more of a variety of configurations, including, for example, analog and/or digital signals.

It should be understood that while examples herein are described in connection with a pressure drop that may be caused by calibration nozzle height $h_1$ being less than actual nozzle height $h_2$, embodiments of present disclosure are not limited to use with this configuration. For example, and without limitation, controller 50 may be configured to compensate for a nozzle height difference $\Delta h$ that may result from a calibration nozzle height $h_1$ being greater than actual nozzle height $h_2$. It should also be understood that while examples herein are described in connection with a nozzle 60 and/or a second nozzle 60', embodiments of the present disclosure may be used in connection with a single nozzle, two nozzles, or more than two nozzles.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements, relative movement between elements, physical connections (e.g., fluid connections), and/or electrical connections (wired and/or wireless). As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A fluid system comprising:
   a fluid conduit configured for connection with a fluid source and a fluid destination;
   a fluid regulator connected to the fluid conduit and configured to regulate fluid flow between said fluid source and said fluid destination;
   a nozzle connected to the fluid conduit and configured to connect the fluid conduit with said fluid destination;
   a first sensor connected to the fluid conduit, the first sensor configured to sense or detect a fluid flow rate;
   a second sensor, the second sensor configured to acquire information from which a height of the nozzle can be determined; and
   a controller configured to control operation of the fluid regulator according to (i) an output of the first sensor and (ii) the information acquired by the second sensor.

2. The fluid system of claim 1, wherein said fluid destination includes an aircraft fuel tank.

3. The fluid system of claim 1, wherein the first sensor includes a fluid pressure sensor, and the output of the first sensor corresponds to a pressure of fluid in the fluid conduit downstream of the fluid regulator.

4. The fluid system of claim 1, wherein the controller is configured to determine a height difference between the nozzle height during calibration and the nozzle height during normal use according to at least the information acquired by the second sensor.

5. The fluid system of claim 4, wherein the second sensor is connected to a lift deck of a fueling tool.

6. The fluid system of claim 1, wherein the information provided by the second sensor includes an absolute height of the nozzle.

7. The fluid system of claim 4, wherein controlling the operation of the fluid regulator includes compensating for the height difference.

8. The fluid system of claim 7, comprising a third sensor configured to detect a flow rate of fluid in the fluid conduit, and wherein compensating for the height difference includes deriving an expected nozzle pressure, and the controller is configured to derive the expected nozzle pressure according to:

$$P_{2e} = P_1 - \left(\frac{Q^2}{C_v^2 \frac{62.4}{\rho}}\right) + x * \Delta h + y, \quad \text{IF } \Delta h \neq 0$$

Where:
$P_{2e}$=the expected nozzle pressure
$P_1$=a fluid pressure sensed via the first sensor;
Q=the flow rate sensed via the third sensor;
$C_v$=a flow coefficient of the fluid system;
$\rho$=a fluid density of fluid in the fluid conduit;
x=a nozzle height offset coefficient;
$\Delta h$=the nozzle height difference; and,
y=a nozzle height offset constant.

9. The fluid system of claim 8, comprising a fourth sensor, wherein the fourth sensor is configured to detect an actual nozzle pressure, and wherein the controller is configured to determine the flow coefficient ($C_v$) of the fluid system while simultaneously detecting the fluid pressure ($P_1$) via the first sensor and the actual nozzle pressure via the fourth sensor.

10. The fluid system of claim 9, wherein the fourth sensor is connected to the nozzle in a calibration configuration of fluid system and is not connected to the nozzle in a normal configuration of the fluid system, and wherein the controller is configured to determine calibration nozzle height via the second sensor while the fluid system is in the calibration configuration.

11. The fluid system of claim 10, wherein the nozzle height offset coefficient (x) is about 0.35.

12. The fluid system of claim 11, wherein the nozzle height offset constant (y) is about 0.37.

13. The fluid system of claim 4, wherein in a first configuration of said fluid destination, the height difference is a first height difference; in a second configuration of said fluid destination, the height difference is a second height difference; and, the second height difference is greater than the first height difference.

14. The fluid system of claim 13, wherein the controller is configured to control the fluid regulator such that a first fluid pressure is provided to said destination in the first configuration and a second fluid pressure is provided to said fluid destination in the second configuration, the second fluid pressure being greater than the first fluid pressure.

15. A method of controlling fluid flow, the method comprising:
  providing a fluid system, the fluid system comprising a fluid control system, and a fluid conduit between a fluid source and a fluid destination, wherein the fluid control system includes:
  a fluid regulator connected to said fluid conduit;
  a flow sensor configured to detect a fluid flow rate of said fluid conduit;
  a pressure sensor configured to detect a fluid pressure of said fluid conduit downstream of the fluid regulator;
  a nozzle connected to said fluid conduit and configured to selectively connect said fluid conduit with said fluid destination;
  a height sensor configured for acquiring a nozzle height; and
  a controller configured to control operation of the fluid regulator;
  obtaining, via the controller, a nozzle height difference between the nozzle height in a calibration configuration of the fluid system and a current value of the nozzle height;
  deriving, via the controller, an expected nozzle pressure according to at least the fluid flow rate, the fluid pressure, and the nozzle height difference; and
  controlling, via the controller, operation of the fluid regulator according to the expected nozzle pressure.

16. The method of claim 15, wherein the expected nozzle pressure is derived according to:

$$P_{2e} = P_1 - \left(\frac{Q^2}{C_v^2 \frac{62.4}{\rho}}\right) + x*\Delta h + y, \text{ IF } \Delta h \neq 0$$

Where:
$P_{2e}$=the expected nozzle pressure
$P_1$=a fluid pressure sensed via the first sensor;
Q=the flow rate sensed via the third sensor;
$C_v$=a flow coefficient of the fluid system;
$\rho$=a fluid density of fluid in the fluid conduit;
x=a nozzle height offset coefficient;
$\Delta h$=the nozzle height difference; and,
y=a nozzle height offset constant.

17. The method of claim 16, wherein the controller is configured to determine an actual nozzle pressure via a nozzle pressure sensor configured for selective connection with the fluid system; and wherein the method of controlling fluid flow comprises determining the flow coefficient ($C_v$) of the fluid system while simultaneously detecting fluid pressure via the pressure sensor and the actual nozzle fluid pressure via the nozzle pressure sensor.

18. The method of claim 17, wherein the flow coefficient ($C_v$) is determined via the calibration configuration of the fluid system.

19. The method of claim 18, wherein the nozzle pressure sensor is connected to the fluid system in the calibration configuration of the fluid system and is not connected to the fluid system in a normal configuration of the fluid system.

20. The method of claim 15, wherein the height sensor is connected to a lift device of a fueling tool and said fluid destination includes an aircraft wing fuel tank.

* * * * *